United States Patent
Jujjuri et al.

(10) Patent No.: US 7,480,654 B2
(45) Date of Patent: Jan. 20, 2009

(54) ACHIEVING CACHE CONSISTENCY WHILE ALLOWING CONCURRENT CHANGES TO METADATA

(75) Inventors: Venkateswararao Jujjuri, Beaverton, OR (US); Malahal R. Nalnenl, Tigard, OR (US); Rohit K. Prasad, Beaverton, OR (US); Senthil Rajaram, Portland, OR (US); Roger C. Raphael, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 11/017,595

(22) Filed: Dec. 20, 2004

(65) Prior Publication Data

US 2006/0136472 A1    Jun. 22, 2006

(51) Int. Cl.
G06F 7/00 (2006.01)
G06F 17/30 (2006.01)
G06F 12/00 (2006.01)

(52) U.S. Cl. .......................................... 707/8; 707/201
(58) Field of Classification Search ................ 707/101, 707/205, 102, 203, 200, 8, 201
See application file for complete search history.

(56) References Cited

U.S. PATENT DOCUMENTS

| 6,128,627 A | 10/2000 | Mattis et al. | 707/202 |
| 6,678,700 B1* | 1/2004 | Moore et al. | 707/200 |
| 2003/0217081 A1 | 11/2003 | White et al. | 707/203 |
| 2005/0125513 A1* | 6/2005 | Lam et al. | 709/220 |

FOREIGN PATENT DOCUMENTS

WO    WO 0184371    11/2001

* cited by examiner

Primary Examiner—Hung T Vy
(74) Attorney, Agent, or Firm—Lieberman & Brandsdorfer, LLC

(57) ABSTRACT

A method and system for supporting a concurrent recordation of a change in a data file by a server while allowing an application to continue writing changes to a data file. In response to a change in a data file, a near-instantaneous version of the file is created. Metadata reflecting the change to the data file are synchronized with a version of the file in cache and recorded in persistent storage. During the process of recording metadata changes to the file, subsequent changes to the data file may continue, and metadata reflecting the changes may be recorded in a subsequent near-instantaneous version of the file which may also be synchronized with a version of the metadata in persistent storage.

18 Claims, 6 Drawing Sheets

ACHIEVING CACHE CONSISTENCY WHILE ALLOWING CONCURRENT CHANGES TO METADATA

BACKGROUND OF THE INVENTION

1. Technical Field

This invention relates to metadata and synchronizing changes to metadata. More specifically, a modified synchronization operation is employed to support an asynchronous write operation by allowing a client to continue to make changes to a data file while the synchronization operation is in the process of updating metadata with a server.

2. Description of the Prior Art

FIG. 1 is a block diagram (10) of a prior art distributed system with shared persistent storage. The distributed system includes a storage area network (22) with multiple server nodes (30) and (40), an administrator node (50), and multiple client nodes (52) and (54). The storage area network (22) has file data space (24) and metadata space (26). The metadata space is reserved for the servers (30) and (40). Each of the clients (52) and (54) may access an object or multiple objects stored on the file data space (24) of the storage area network (22), but may not access the metadata space (26). In opening the contents of an existing file object on the storage media in the storage area network (22), a client contacts the server to obtain metadata and locks. The server performs a look-up of metadata information for the requested file within the metadata space (26) of the storage area network (22). One of the servers (30) or (40) communicates granted lock information and file metadata to the requesting client, including the location of all data blocks making up the file. Once the client holds a distributed lock and knows the data block location(s), the client can access the data for the file directly from a shared storage device attached to the storage area network.

With respect to the system shown in FIG. 1, metadata provides information pertaining to location of data requested from a client machine in a distributed file system or a client/server node in a non-distributed file system. Metadata contains information in the form of blocks used, file size, modification time, etc. In a distributed file system, the metadata is maintained by the server. Upon access of a file by a client changes to the file may occur. Metadata reflecting the changes need to be communicated to the server. There are two general categories of write modes. A first category is known as a synchronous write mode wherein all writers or metadata modifiers of a corresponding file object are blocked from proceeding with writing any additional changes to a data file until a prior metadata transaction update to the server node is completed. The second category is known as an asynchronous write mode which supports writers or metadata modifiers changing a corresponding file object and defers data and metadata transaction updates to the server. FIG. 2 is a flow chart (100) illustrating a prior art process of an asynchronous write operation. Upon receiving a write request, a client conducts a test to determine if a write to the data in the file can proceed (102). A negative response will require the client to wait to make changes to the file for a period of time before returning to step (102) to repeat the inquiry. In one embodiment, an application thread sleeps until a thread that synchronizes the data and metadata wakes up the application thread. Once a positive response to the test at step (102) is received, the application on the client updating the file writes data into the clients data cache (104). Following step (104), the application updates the metadata in the clients cache (106), and the application returns to processing (108). In an asynchronous write mode, there is greater concern for immediate performance than in writing data to disk and synchronizing the client's cache with the cache of the server. A file system operating in an asynchronous manner may employ a synchronization thread to execute a delayed synchronization operation when the state of the client metadata and the server metadata need to be consistent. Usually this synchronization thread will run periodically to synchronize the client's cache with persistent storage. Accordingly, the prior art asynchronous write mode eventually employs a synchronization thread when the clients data cache needs to be written to persistent storage and consistency of the client metadata with the server metadata is required.

FIG. 3 is a flow chart (120) illustrating a prior art synchronization thread, also known as a synchronization operation, for synchronizing file system cache. This synchronization usually employs the following two sequential steps: writing data cache to disk, and updating the metadata changes. In a distributed file system, the metadata changes need to be updated to the server. Following changes to a data file by an application, synchronization of the client data file is initiated (122). Once the synchronization operation is initiated, the current application or other applications executing on the client are blocked from making further changes to the data file (124). Thereafter, the clients data cache is written to persistent storage of local storage media (126), followed by sending a transaction update of the client's metadata changes to the server and the client enters a wait state while it is waiting to receive a response (128). Once the client sends the metadata transaction update to the server, the clients cache is marked to reflect the outgoing communication and the client waits to receive a response from the server before proceeding with allowing an application to write to a file. Following receipt of the metadata update (130), the server sends the metadata update transaction to persistent storage in a storage area network (132) followed by a response to the client that initiated the metadata update indicating recordation of the metadata change in the storage area network (134). Similarly, upon receipt of a communication from the server (136), the client processes the response (138) so that applications may proceed with writing to that data file (140). The communication received by the client at step (136) does not indicate the recordation of metadata changes by the server. Rather, the communication received at step (136) will indicate whether the metadata update was properly recorded in the shared storage media. If the metadata update was not recorded this indicates that an error occurred and the server cannot apply the client's changes to the metadata. Accordingly, the prior art example shown in FIG. 3, shows a synchronization operation where writers or metadata modifiers of the corresponding file object are blocked from proceeding with writing any additional changes to a data file until the metadata update in progress is complete through a transaction to the server.

As illustrated above, there are shortcomings associated with the prior art. For example, all modifiable operations to the data file are blocked for the entire duration of the synchronization process of that file. This block duration is significant in a distributed file system where network transactions are involved. If more than one synchronization thread is running in parallel, this could cause miscommunication for applications streaming transaction updates to the server. Therefore, there is a need for modifying the prior art synchronization process to support a metadata update transaction that does not block writers or applications that modify metadata for the entire period of a metadata update transaction.

SUMMARY OF THE INVENTION

This invention comprises a method and system for conducting a metadata update transaction regarding a file while enabling writers or applications to continue modifying the file.

In one aspect of the invention, a method is provided to maintain cache consistency. A metadata update request is forwarded from a client to a storage media. A modification to a metadata cache of the client is allowed while the metadata update request is pending.

In another aspect of the invention, a computer system is provided with metadata. A requestor is provided to communicate a metadata update request to a storage media. In addition, a manager is provided to allow a modification to a metadata cache of the requestor while the metadata update is in a pending status.

In yet another aspect of the invention, an article is provided with a computer-readable recordable data storage medium. Means in the medium are provided to forward a metadata update request from a client to a storage media. In addition, means in the medium are provided to allow a modification to a client metadata cache while the metadata update request is pending.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A near-instantaneous copy of metadata of a data file is produced as part of the synchronous operation. The near-instantaneous copy of the metadata records all changes to the metadata. In order to synchronize the client changes to the metadata with a copy retained by a server node in communication with the client, the near-instantaneous version of the client metadata is forwarded to the server node for recordation in the storage area network. During the process of recording the metadata changes, an application executing on the client may continue to write changes to the file and have these changes recorded in another near-instantaneous version of the client metadata before sending another metadata update to the server. Accordingly, the use of creating and recording a near-instantaneous version of changes to the client metadata supports concurrently recording the changes to the file while allowing an application to continue writing changes to the file.

Technical Details

Figure 4:
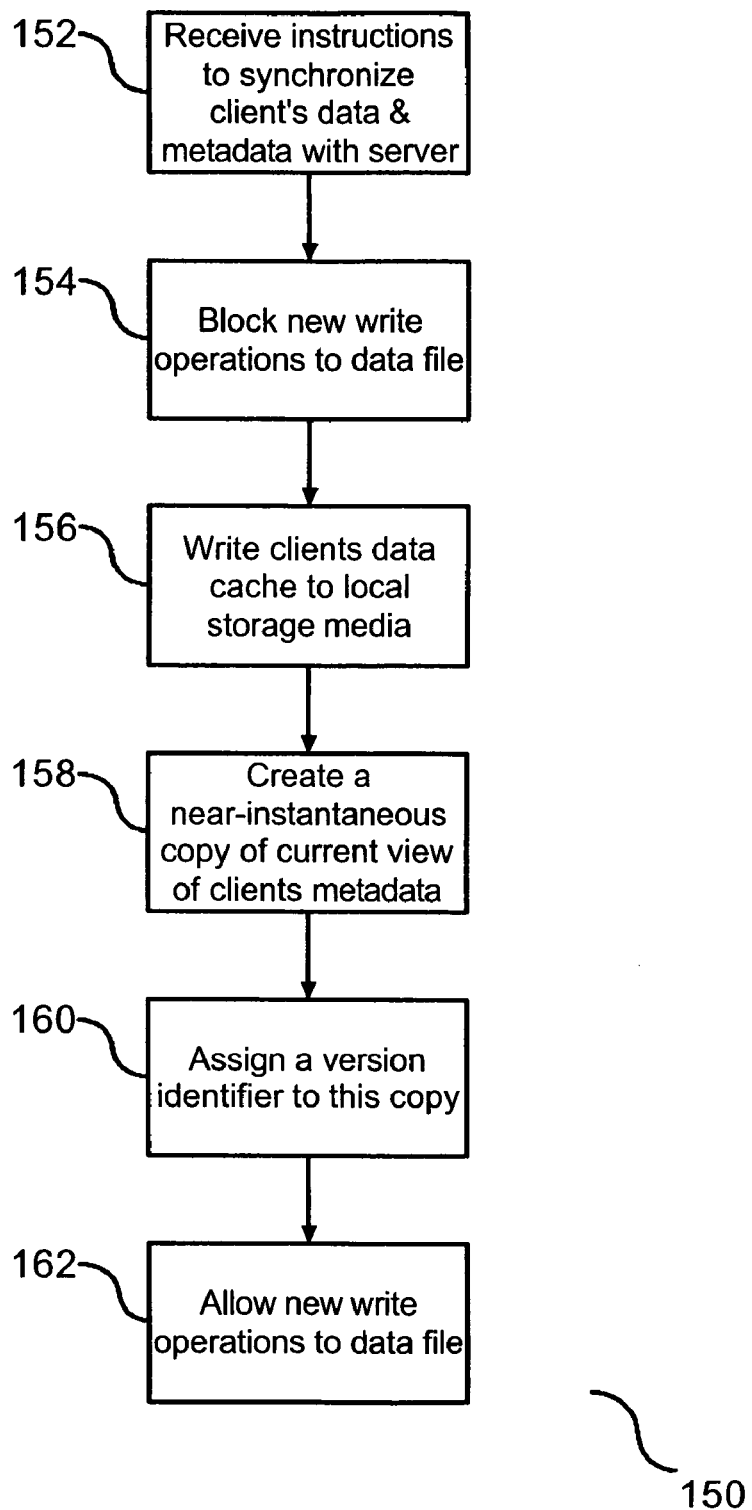
FIG. 4 is a flow chart illustrating a process for creating a near-instantaneous copy in a synchronization operation of a metadata update in a distributed file system.

FIG. 4 is a flow chart (150) illustrating a method for synchronizing a change in data and metadata in the client's cache with local storage media and with server metadata according to one embodiment of the invention. A near-instantaneous version of a metadata update is created and sent to a server node in a distributed file system to mitigate network latency and server latency while processing the metadata update transaction request. The near-instantaneous version is an image of the state of the client cache. As shown, upon receiving an instruction to synchronize client's data and metadata with the server (152), the current application or other applications are blocked from making further changes to that data file (154). Thereafter, the clients data cache is written to persistent storage of local storage media (156), followed by creation of a near-instantaneous version of the client metadata to record a current state of the client's metadata (158). The near-instantaneous version created at step (158) is assigned an identifier (160). Once the near-instantaneous version is complete the block from step (154) is removed and new write transactions to the client data file may proceed (162). Accordingly, a near-instantaneous version of the client's metadata records the state of the client metadata and enables the client to continue operating in an asynchronous write mode and write changes to the file while the near-instantaneous version of the metadata cache is prepared for processing to the server.

Figure 1:
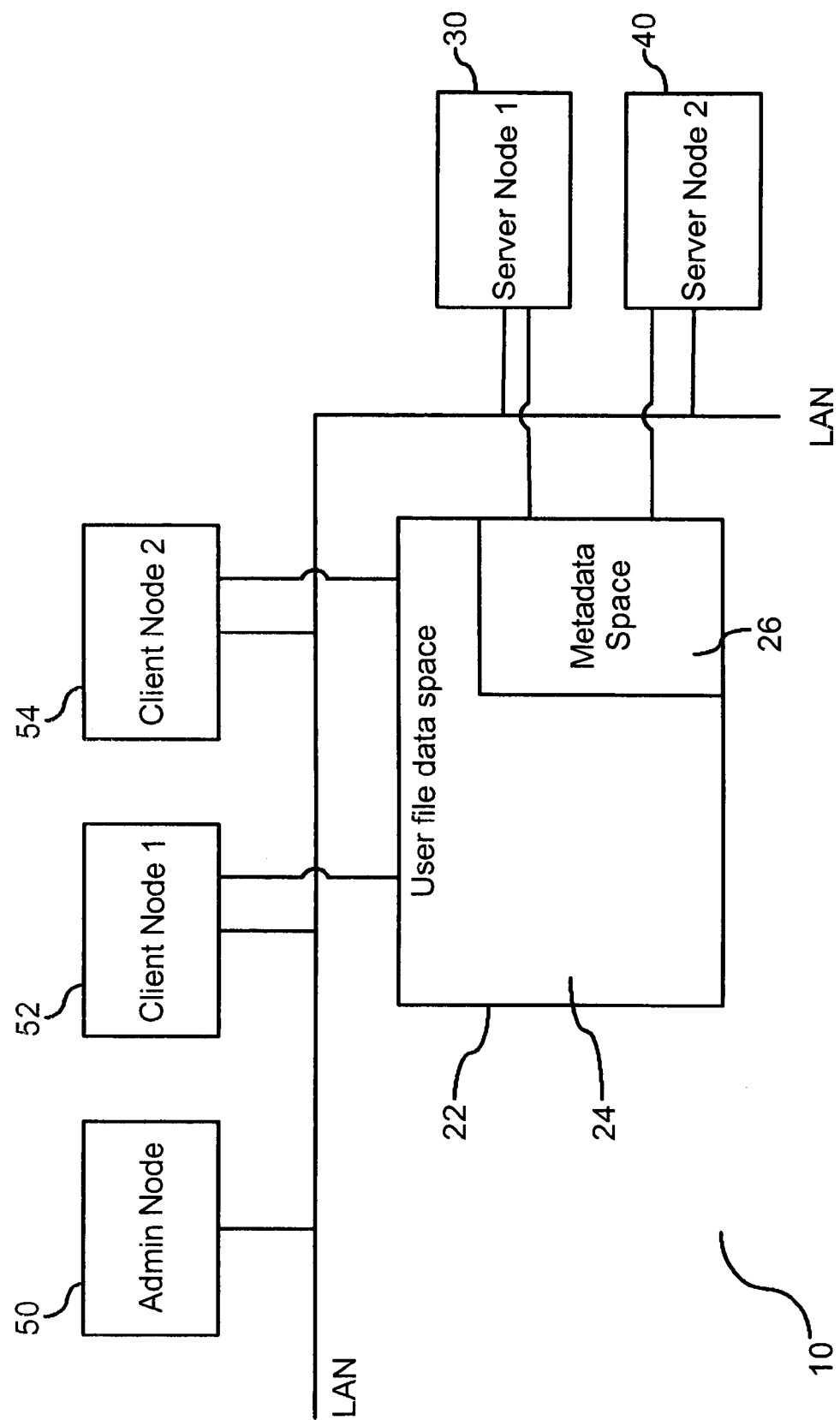
FIG. 1 is a prior art block diagram of a distributed file system.
Figure 5:
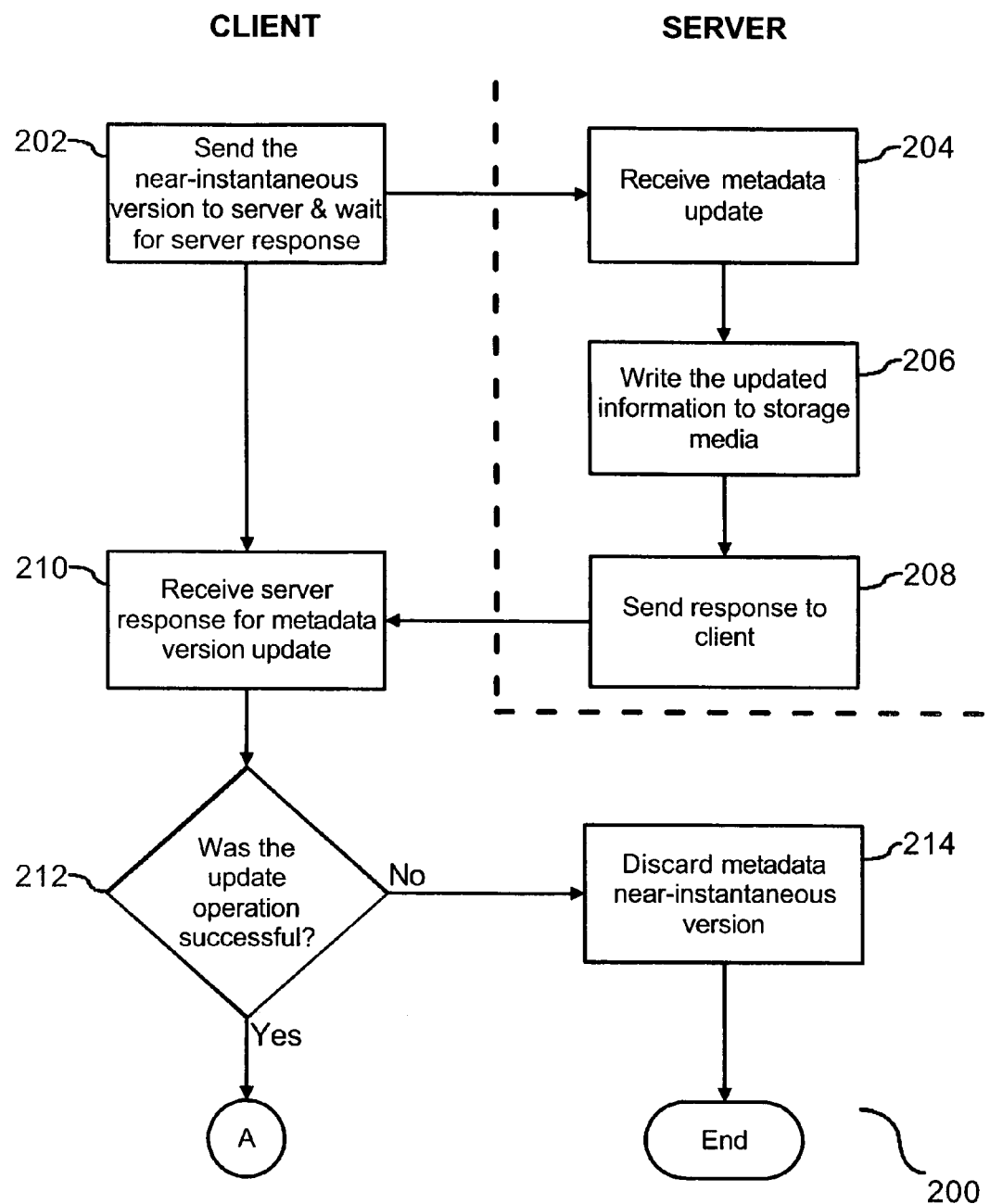
FIG. 5 is a flow chart illustrating a modified synchronization operation in a distributed file system according to the preferred embodiment of this invention, and is suggested for printing on the first page of the issued patent.

FIG. 5 is a flow chart (200) illustrating the process of recording the near-instantaneous version of the client's state of the cache on shared storage media. Following creation of the near-instantaneous version of the client's metadata, the near instantaneous version of the client metadata is sent to the server and the client enters a wait state while it is waiting to receive a response from the server indicating the near-instantaneous version has been recorded in persistent storage (202). Upon receipt of the near-instantaneous version of the client metadata by the server (204), the changes in the metadata cache are written to shared persistent storage (206). In a distributed file system as shown in FIG. 1, the storage area network is the persistent storage that records the metadata changes. Following the server writing the metadata changes to persistent storage, a response is sent from the server to the client machine indicating receipt of the near-instantaneous version of the metadata update (208). Upon receipt of a server response by the client (210), a test is conducted to determine if recordation of the near-instantaneous version of the metadata update by the server was successful (212), i.e. the changes to the metadata cache were properly recorded in the storage area network. A negative response to the test at step (212) will require the client to discard the corresponding near-instantaneous version of the metadata update that failed recordation (214). The process of forwarding the near-instantaneous version to the server to synchronize the client metadata with the server does not guarantee that the changes reflected in the near-instantaneous version will be successfully recorded in the storage area network. The changes to the client data and metadata that were not recorded in the storage area network remain with the client and are marked as non-recorded. Once a near-instantaneous version of the client metadata has been created, the client may support subsequent asynchronous write operations to the data file, wherein the changes to the client data and metadata associated with the subsequent write operations and any previously non-recorded changes to the client data are metadata are recorded in another near-instantaneous copy with a different version identifier. Accordingly, the creation of the near-instantaneous version of the state of the cache supports allowing further asynchronous write operations to continue to the file while the near-instantaneous version is in the process of being recorded in the storage area network.

Figure 6:
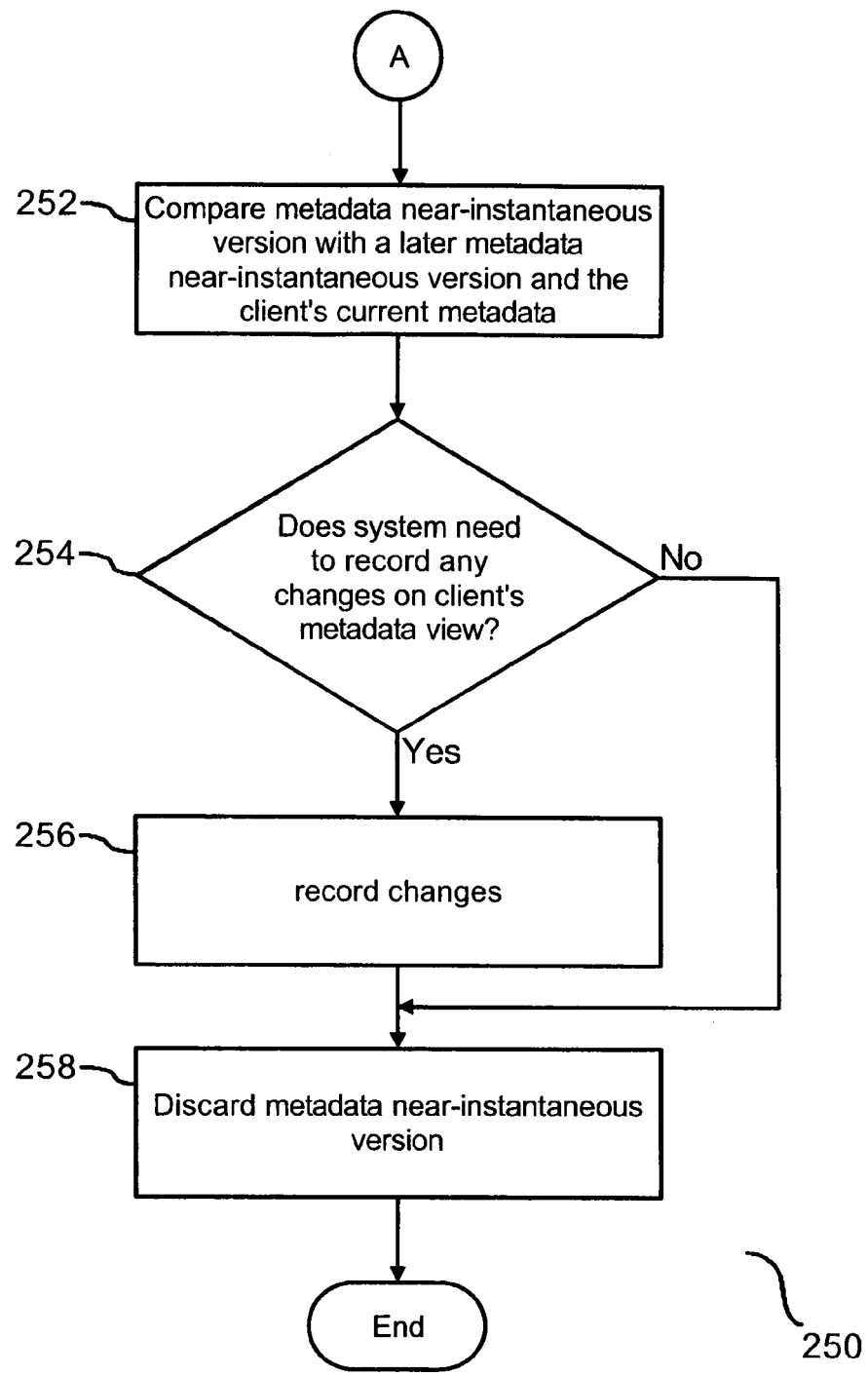
FIG. 6 is a flow chart illustrating a process for balancing the server recorded metadata with a current state of the client metadata.

FIG. 6 is a flow chart (250) illustrating a process for balancing the client metadata with the current state of the server metadata. If the response to step (212) in FIG. 5 is negative, the client discards the corresponding near-instantaneous version of the metadata (214). The fact that the server did not accept and record the changes to the metadata does not cause any correctness issues since the changes to the client data and metadata are marked as not recorded with the storage area network and may be recorded in a different near-instantaneous version of the client cache. However, following a positive response to the test at step (212), the client compares the near-instantaneous version of the client metadata related to this transaction, with any near-instantaneous versions of the client metadata created after this version, and also with client's metadata cache. Following the comparison at step (252), a test is conducted to determine if any update is required to balance the client's metadata view with the metadata of the server (254). If the test at step (254) is positive, the client may mark the changes into its metadata cache (256) followed by discarding the version of the corresponding near-instantaneous version of the metadata that the server recorded in persistent storage (258). The client may allow an application to continue asynchronous write operations to the data file. However, if the comparison at step (254) is negative, no changes to the current state of the client metadata are required. The identifier of the corresponding near-instantaneous version of the metadata that the server recorded in persistent storage may be discarded (258). Accordingly, upon determining that the server node successfully recorded the near-instantaneous version in persistent storage, the client metadata is balanced with the server metadata by recording the state of the server metadata in the client cache.

As described in FIG. 5, metadata associated with changes to the file are recorded in a near-instantaneous version, which is an image of the state of the client cache. In one embodiment, the near-instantaneous version is stored on a computer-readable medium as it contains data in a machine readable format. A requestor may be provided to determine the need for creation of a near-instantaneous version of the state of the metadata and to communicate the near-instantaneous version to an associated server. A manager may also be provided to control creation of a subsequent near-instantaneous version of file metadata, and to control further changes to a data file while recordation of a prior version of the metadata is pending with the server. The managers may be in the form of hardware elements within the computer system, or software elements in a computer-readable medium.

Advantages Over The Prior Art

Figure 2:
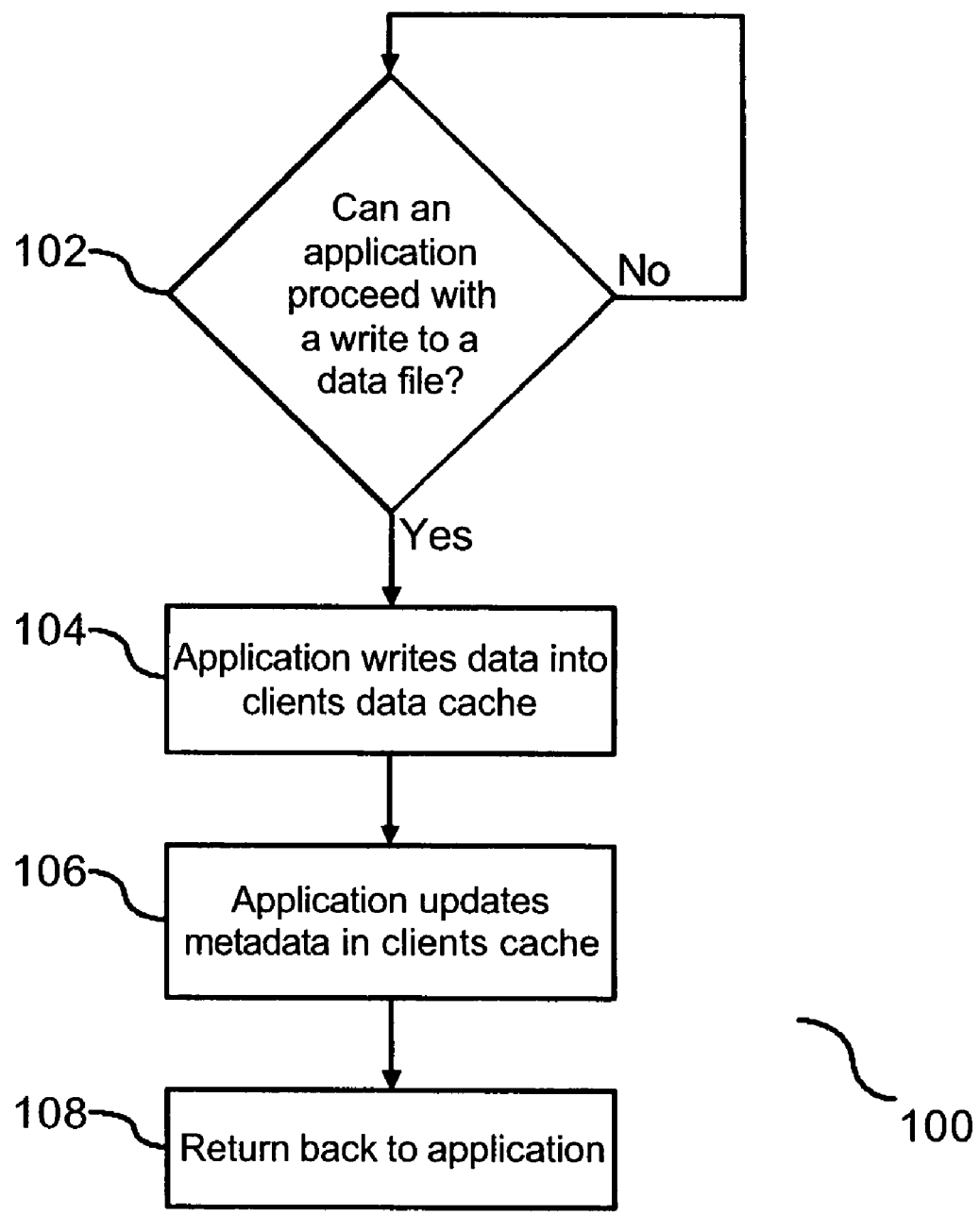
FIG. 2 is a prior art flow chart illustrating an asynchronous write mode in a distributed file system.
Figure 3:
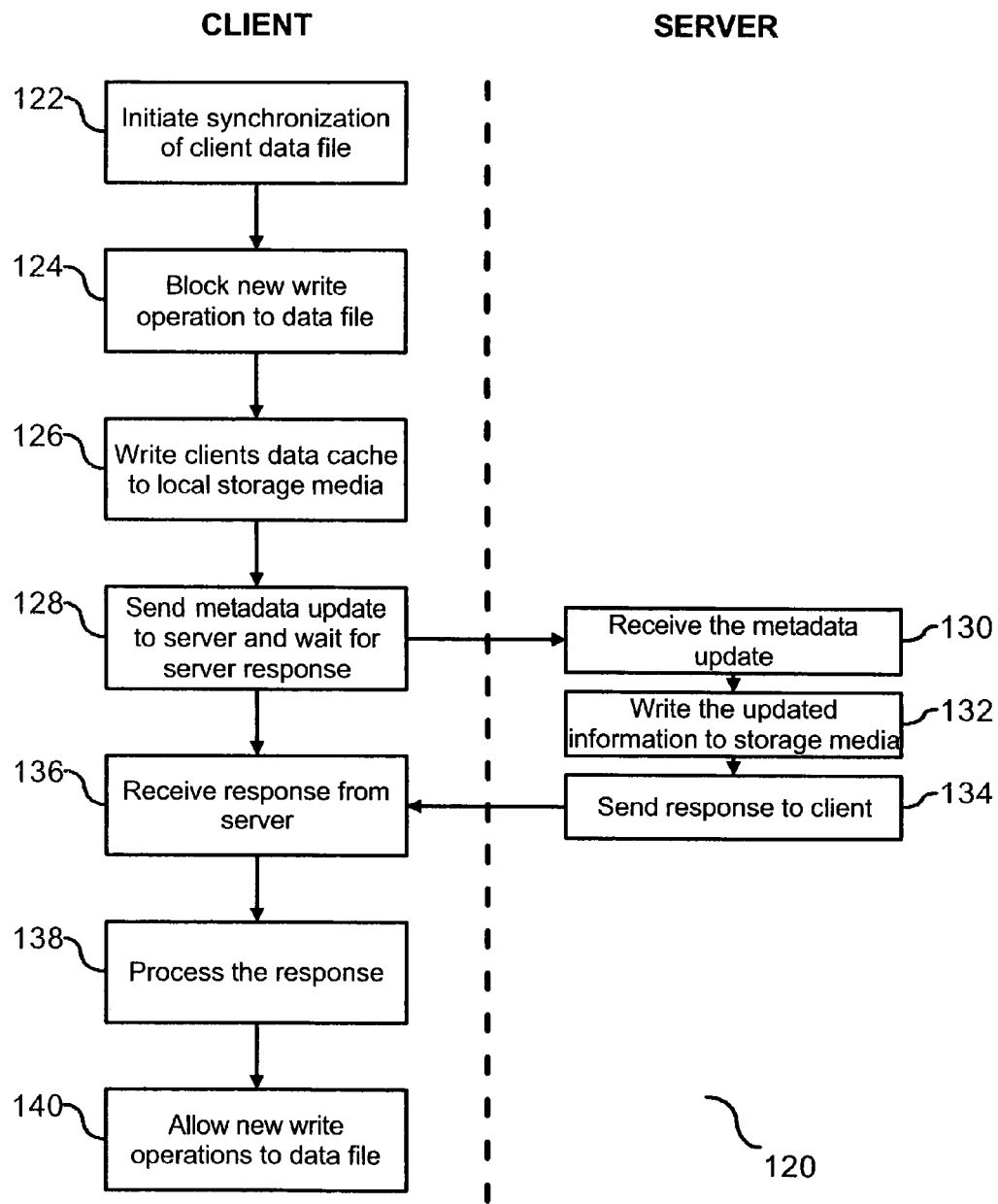
FIG. 3 is a prior art flow chart illustrating a synchronization operation in a distributed file system.

The synchronization operation of updating cache to a server with the use of a near-instantaneous version of the client cache for recording changes to the client metadata enables an application operating on a client machine to continue to write to a file while a metadata update on the corresponding file is pending with the server. This operation imitates the efficiency associated with an asynchronous write mode as shown in FIG. 2 while eliminating the shortcomings associated with the prior art asynchronous write mode. The synchronization operation of the preferred embodiment that supports an asynchronous write mode reduces latency by eliminating the process of blocking applications from writing to a file until a previous transaction has completed an update with the server. Accordingly, the process of using the near-instantaneous version to enable an application to write data to a file and support concurrent recordation of a prior version of a data file enhances performance of applications which perform sequential write operations on a file.

Alternative Embodiments

It will be appreciated that, although specific embodiments of the invention have been described herein for purposes of illustration, various modifications may be made without departing from the spirit and scope of the invention. In particular, the computer system is not limited to a distributed file system. Rather, the method and system shown herein may apply to a non-distributed file system. Accordingly, the scope of protection of this invention is limited only by the following claims and their equivalents.

We claim:

1. A method for maintaining cache consistency comprising:
    creating a first near-instantaneous version of client metadata cache in response to a metadata synchronization request;
    assigning an identifier to said created first near-instantaneous version of client metadata cache;
    forwarding a metadata update provided by said first near-instantaneous version of client metadata cache from said client to a server in communication with shared storage;
    allowing modification to a metadata cache of said client concurrent with synchronization of said metadata update provided by said first near-instantaneous version with said server, and
        supporting a subsequent asynchronous write operation to client data by creating a second near-instantaneous version of said client metadata cache reflecting changes to client cache and metadata, and assigning a second identifier to said second near-instantaneous version.

2. The method of claim 1, further comprising said server synchronizing metadata cache with said first near-instantaneous version of said client metadata.

3. The method of claim 2, wherein said near-instantaneous version of said client metadata is an image of a state of client cache.

4. The method of claim 3, wherein the step of synchronizing metadata cache with said metadata update includes comparing said near-instantaneous version of said metadata update with said second near-instantaneous version of said metadata and discarding one of said near-instantaneous versions of said metadata update if a communication is transmitted indicating failure of recording said metadata update to storage media.

5. The method of claim 3, wherein the step of synchronizing metadata cache with said metadata update includes comparing said near-instantaneous version of said metadata update with said second near-instantaneous version of said metadata and marking changes in cache of a current version of metadata with said near-instantaneous version of said metadata update in response to a successful recordation of said metadata update to storage media.

6. The method of claim 1, wherein said near-instantaneous version of client metadata originates in a client machine and is communicated to a server of a distributed file system.

7. A computer system comprising:
a first near-instantaneous version of client metadata cache created to record a state of client cache responsive to a metadata synchronization request;
a first identifier assigned to said first near-instantaneous version of client metadata;
a requestor to communicate said first near-instantaneous version of client metadata to a server in communication with shared storage media;
a manager to allow a modification to a metadata cache of said requestor concurrent with synchronization of said first near-instantaneous version of said client metadata with said server; and
said manager to support a subsequent asynchronous write operation to client data by creation of a second near-instantaneous version of said client metadata cache to reflect changes to client cache and metadata, and to assign a second identifier to said second near-instantaneous version.

8. The system of claim 7, further comprising a cache manager adapted to synchronize metadata cache with said metadata update.

9. The system of claim 8, wherein said near-instantaneous version is a metadata update of a change to said metadata.

10. The system of claim 9, wherein said cache manager compares said near-instantaneous version of said metadata update with said second near-instantaneous version of said metadata and said cache manager is adapted to discard one of said near-instantaneous versions of said metadata update in response to a communication in the form of a failure of recordation of said metadata update to storage media.

11. The system of claim 9, wherein said cache manager compares said near-instantaneous version of said metadata update with said second near-instantaneous version of said metadata and said cache manager is adapted to mark changes in cache of a current version of metadata with said near-instantaneous version of said metadata update in response to communication of a successful recordation of said metadata update to storage media.

12. The system of claim 7, wherein said metadata update originates in a client machine and is communicated to a server of a distributed file system.

13. An article comprising:
a computer-readable recordable data storage medium;
creating a first near-instantaneous version of client metadata cache and storing said first near-instantaneous version in said medium;
means in the medium for assigning an identifier to said created first near-instantaneous version of client metadata;
means in the medium for forwarding a metadata update provided by said first near-instantaneous version of client metadata cache from a client to a server in communication with shared storage media;
means in the medium for allowing modification to a metadata cache of said client concurrent with synchronization of said metadata update provided by said first near-instantaneous version with said server, and supporting a subsequent asynchronous write operation to client data by creating a second near-instantaneous version of said client metadata cache reflecting changes to client cache and metadata, and assigning a second identifier to said second near-instantaneous version.

14. The article of claim 13, further comprising means in the medium for said server synchronizing metadata cache with said first near-instantaneous version of said metadata.

15. The article of claim 14, wherein said near-instantaneous version of said client metadata is an image of a state of client cache.

16. The article of claim 15, wherein said means for synchronizing metadata cache with said metadata update includes comparing said near-instantaneous version of said metadata update with said second near-instantaneous version of said metadata and discarding one of said near-instantaneous versions of said metadata update if a communication is transmitted indicating failure of recording said metadata update to storage media.

17. The article of claim 15, wherein said means for synchronizing metadata cache with said metadata update includes comparing said near-instantaneous version of said metadata update with said second near-instantaneous version of said metadata and marking changes in cache of a current version of metadata with said near-instantaneous version of said metadata update in response to a successful recordation of said metadata update to storage media.

18. The article of claim 13, wherein said metadata update originates in a client machine and is communicated to a server of a distributed file system.

* * * * *